Patented Apr. 20, 1943

2,317,149

UNITED STATES PATENT OFFICE 2,317,149

MANUFACTURE OF VINYL RESINS

Theodore R. Lemanski, Belleville, N. J., assignor to E. I. du Pont de Nemours & Company, Wilmington, Del., a corporation of Delaware No Drawing. Application April 1, 1942, Serial No. 437,225

2 Claims. (Cl. 117—100)

This invention relates to the manufacture of vinyl resins, and more particularly to the manufacture and treatment of polyvinyl acetate in granular form and to its subsequent hydrolysis to polyvinyl alcohol.

In United States Patent 2,245,040 of B. M. Marks are discussed certain difficulties which arise in the drying, handling and storage of polyvinyl acetate in granular form as a result of the strong tendency of the granules to agglomerate and to adhere to metal surfaces. These mechanical difficulties are solved, according to said patent, by a process comprising coating the granules of polyvinyl acetate with a lubricating substance of fatty nature having a melting point above room temperature, before drying the granules, and thereafter drying them at an elevated temperature not, however, exceeding the melting point of the lubricating substance.

The various lubricating substances of fatty nature mentioned in the Marks patent all achieve the purposes set forth in the patent, some more effectively than others. And, when the polyvinyl acetate is converted, by steps of hydrolysis and condensation, into a polyvinyl acetal resin, all of them are free from undesirable effects by reason of the fact that the substances themselves, or the products to which they are converted by reactions to which they may be subjected in the course of these steps, are washed away by the large volumes of liquid vehicle so that they do not remain to contaminate the final product.

When, however, the final product is polyvinyl alcohol (or, more precisely, a more or less nearly completely hydrolyzed polyvinyl acetate, for which the term "polyvinyl alcohol" is conveniently used), then the opportunity for the removal of these lubricating substances, or of products into which they may have been converted by the step of hydrolysis of the polyvinyl acetate, may be inadequate to dispose of them, and it becomes necessary to take cognizance of any deleterious effects of their presence in the polyvinyl alcohol.

This is particularly true when the process of making polyvinyl alcohol from polyvinyl acetate makes no provision for the removal of non-volatile components of the reaction batch. Such a process is that of United States Patent 2,227,997 of Herbert Berg, which comprises reacting polyvinyl acetate, in the presence of a catalyst of hydrolysis, with an alcohol, such as methanol, in so small an amount that the polyvinyl acetate is not dissolved but merely softened to form a plastic or doughy mass which, as the hydrolysis proceeds, is converted to a slurry of polyvinyl alcohol, from which the by-product ester and the remainder of volatile alcohol are removed by volatilization. The polyvinyl alcohol prepared by this method obviously retains all non-volatile components of the batch.

It will thus be contaminated by catalyst or, more usually, by the conversion product thereof (e. g., sodium acetate), and also by the lubricating substance which has accompanied the polyvinyl acetate into the reaction, or by the product of reaction of such substance. The various lubricating substances proposed in the Marks patent have been found to be objectionable contaminants in the polyvinyl alcohol, either because they are a source of haze or because they cause frothing of aqueous solutions of polyvinyl alcohol or both. The uses to which polyvinyl alcohol are applicable depend for the most part upon putting it into solution in water.

The objects of the present invention are in part those of United States Patent 2,245,040, namely to provide means for avoiding the caking of finely divided polyvinyl acetate in the course of drying and, correspondingly, for promoting rapid and thorough drying of it by making feasible the use of temperatures not otherwise feasible because of the tendency of the individual particles of polyvinyl acetate to agglomerate, means for eliminating the tendency of finely divided polyvinyl acetate in dry or approximately dry condition to cake under normal conditions of storage, and means for promoting ease of solution of finely divided polyvinyl acetate in organic solvent.

An important further object of the present invention, however, is the accomplishment of the foregoing objects by means which will not cause the impairment of the quality and utility of polyvinyl alcohol prepared from polyvinyl acetate thus handled. And thus it is a further object of the invention to promote the economical manufacture of polyvinyl alcohol of unobjectionable quality. Other objects will be apparent from the description of the invention given hereinafter.

The above objects are accomplished according to the present invention by the steps, in the manufacture of polyvinyl acetate in finely divided form where the polyvinyl acetate is prepared in finely divided form suspended in an aqueous vehicle, comprising coating the particles of polyvinyl acetate with sebacic acid before drying them and then drying the particles at an elevated temperature. More specifically, the invention is carried out by separating the finely divided polyvinyl acetate from the aqueous vehicle, adding the sebacic acid to it, stirring the resulting mixture until the particles of polyvinyl acetate are coated by the sebacic acid, and then drying the particles at an elevated temperature.

The invention is applicable similarly to copolymers in which vinyl acetate is a major constituent and which, in granular form, offer the same difficulties in drying. Examples of such copolymers are those of vinyl acetate with ethylene (94:6 by weight) and of vinyl acetate and methyl methacrylate (80:20 by weight).

Sebacic acid has not been heretofore recognized as having lubricating qualities or anti-adhesive properties such as would make it useful in the prevention of adhesion of an actively or latently tacky material. Surprisingly, however, it does function effectively to prevent the various difficulties due to adhesiveness which arise in the drying, handling and storage of granular polyvinyl acetate. It is, furthermore, more effective than some of the lubricating substances of United States Patent 2,245,040 during the early stages of the drying of granular polyvinyl acetate, when the granules are actually wet so that a tendency to stick together is contributed by the surface tension of water. Thus on the basis of mechanical performance alone, sebacic acid is a useful and effective agent for promoting rapid drying of granular polyvinyl acetate through preventing its caking at useful drying temperatures, and for preventing the caking of dry polyvinyl acetate in handling and storage.

It has, furthermore, a peculiar advantage when the polyvinyl acetate is to be converted into polyvinyl alcohol as the final product by a process which does not provide for the removal of nonvolatile contaminants. Under the alkaline conditions provided for the hydrolysis of polyvinyl acetate to polyvinyl alcohol, the sebacic acid is converted into an alkali-metal sebacate which, being easily soluble in water but free from tendency to cause frothing, is no more objectionable as a contaminant of the polyvinyl alcohol than is the alkali-metal acetate which it also contains as a contaminant.

In carrying out the present invention, the sebacic acid, in finely pulverized condition, is introduced into the bath of wet granules of polyvinyl acetate after separation of the granules from the liquid vehicle in which they were formed. The mixture is then stirred to achieve an adequate distribution of the sebacic acid upon the granules, this distribution being assisted by the slight solubility of sebacic acid in water. The granules are then dried at any convenient temperature which will not damage the polyvinyl acetate or cause an excessive softening of the polymer which might contribute a tendency to agglomeration in spite of the presence of the coating. In general, air temperatures up to 100° C. can safely be used at the feed end of the dryer, and since ordinarily a rapid drying is desirable for reasons of economy the temperature will seldom be below 50° C.

The invention is independent of the manner in which the granules of polyvinyl acetate have been prepared, which may be, for example, that disclosed in French Patent 801,034.

The polyvinyl acetate in granular form, however made, is separated from the aqueous vehicle, in which it has been prepared, by any convenient method such as a centrifuge. At this point it is, of course, still moist and the granules tend to agglomerate by reason of this moisture, much as does wet sand. If, without special treatment, it is now fed into a rotary drier, it tends to cake upon the walls of the drier and to agglomerate, at first by reason of the surface tension of the water associated with it, and later by reason of tackiness of the granules themselves, which is promoted by heat. For this latter reason, prior to the invention disclosed in United States Patent 2,245,040 it had been found necessary to limit the temperature within the drier to about 30° C., and the time required for anything like thoroughly drying of the polymer at such a temperature is excessive.

In accordance with the present invention there is added to the moist polymer, before it is fed into the drier or during its entry into the drier, an amount of finely pulverized sebacic acid which will usually be between about 0.3% and about 1.0% of the dry weight of the polymer. The pulverulent sebacic acid may, for example, be stirred into the mass of granular polymer with the assistance of a light mixer or of a feeding device by which the polymer is introduced into the drier. The latter device may take the form of a screw conveyor, within which the sebacic acid, suitably dosed into the mass entering the screw conveyor, will become distributed upon the granules by the rubbing action within the conveyor.

Polyvinyl acetate thus treated with sebacic acid is dried without agglomerating and without adhering to the metallic parts of the drier, even though the air temperature in the drier be as high as 100° C. At such a high temperature, the time required for substantially thorough drying of the polyvinyl acetate is a small fraction of that required at the lower temperature to which the drying must be restricted in the absence of a lubricating agent.

The presence of the sebacic acid as a coating upon the granules of dried polymer eliminates likewise the tendency, which characterizes an unlubricated product, of caking or agglomerating during handling and storage. Furthermore, by rendering the granules of polyvinyl acetate less immediately susceptible to the action of vapors of solvent, the presence of the coating of sebacic acid facilitates the feeding of the dry granular material through chutes and the like into vessels containing voltatile solvent, of which the vapors rise into such chutes. This is accomplished without appreciably delaying the desired action of the liquid solvent upon the granules once they have been immersed therein.

The present invention provides a lubricating substances, constituting an improvement over those disclosed in United States Patent 2,245,040, which substance serves to prevent the agglomeration and caking of granular polyvinyl acetate in the course of its being dried from a water-wet, e. g. a centrifuged, product to a condition of substantially complete dryness, and is of peculiar value in that process because of its efficacy in reducing the tendency of the granules to agglomerate during the earlier stages when they are still actually wet with water. Like the lubricating substances of United States Patent 2,245,040, sebacic acid coated upon the granules of polyvinyl acetate in the drier permits of the operation of the drier at temperatures well in excess of those to which it must be limited in the absence of lubricating substance, and thus makes possible a relatively rapid drying of the polymer. The restriction of the drying temperature by the melting point of the lubricating substance, which must be considered in the selection of a lubricating substance from among those disclosed in United States Patent 2,245,040, is of only academic interest when sebacic acid is used, since its melting point is well in excess of any temperature which would be used in drying polyvinyl acetate.

The coating with sebacic acid likewise prevents agglomeration and caking of the dried polyvinyl acetate during handling and storage, including handling in the presence of vapors of solvent.

Sebacic acid as a lubricant coating for granules of polyvinyl acetate has further the peculiar advantage of producing no objectionable effect through contamination of polyvinyl alcohol derived as an end-product from the polyvinyl acetate, and its use as a lubricant coating in the drying of polyvinyl acetate is accordingly of particular value when the conversion of polyvinyl acetate to polyvinyl alcohol as a final product does not provide for the removal from the latter of the coating lubricant used or of the products into which the coating lubricant may be converted by the process of hydrolysis applied to the polyvinyl acetate.

As many apparently widely different embodiments of this invention may be made without departing from the spirit and scope thereof, it is to be understood that the invention is not limited to the specific embodiments thereof except as defined in the appended claims.

I claim:

1. In the manufacture of polyvinyl acetate in finely divided form where said polyvinyl acetate is prepared in finely divided form suspended in an aqueous vehicle, the steps comprising coating the particles thereof with sebacic acid before drying them and then drying said particles at an elevated temperature.

2. In the manufacture of polyvinyl acetate in finely divided form where said polyvinyl acetate is prepared in finely divided form suspended in an aqueous vehicle, the steps comprising separating said polyvinyl acetate from said aqueous vehicle, adding to said polyvinyl acetate, as a lubricating substance, sebacic acid, stirring the resulting mixture until the particles of said polyvinyl acetate are coated by said sebacic acid, and then drying said granules at an elevated temperature.

THEODORE R. LEMANSKI.